United States Patent [19]

Siverbrook et al.

[11] Patent Number: 5,422,990
[45] Date of Patent: Jun. 6, 1995

[54] BEZIER SPLINE TO QUADRATIC POLYNOMIAL FRAGMENT CONVERSION

[75] Inventors: Kia Siverbrook, Woollahra; Simon R. Walmsley, Epping; Jim Mulhearn, Eastwood; Vincenzo A. L. Liguori, Mosman, all of Australia

[73] Assignees: Canon Kabushiki Kaisha, Tokyo, Japan; Canon Information Systems Research Australia Pty Limited, New South Wales, Australia

[21] Appl. No.: 53,213

[22] Filed: Apr. 28, 1993

[30] Foreign Application Priority Data

Apr. 29, 1992 [AU] Australia .................. PL2149

[51] Int. Cl.$^6$ .................................. G06K 9/46
[52] U.S. Cl. ........................................ 395/142
[58] Field of Search .................. 395/141, 142, 143; 364/718, 720, 721

[56] References Cited

U.S. PATENT DOCUMENTS 5,297,244  3/1994  Pomichter, Jr. ............... 395/143
5,313,529  5/1994  Itonori ........................... 382/24

Primary Examiner—Phu K. Nguyen
Attorney, Agent, or Firm—Fitzpatrick, Cella, Harper & Scinto

[57] ABSTRACT

Method and apparatus for converting an object of a computerized graphics system defined by a plurality of spline formats into a corresponding object defined by a plurality of quadratic polynomial fragments (QPF). The method and apparatus include, for each spline of the object, selecting start and end points on the spline and designating the selected start and end points as control start and end points on the corresponding QPF, determining from the control points of the spline coefficients of a quadratic polynomial defining the QPF. The coefficients of the quadratic polynomial are used to determine if an error between the spline and the quadratic polynomial is below a predetermined level. In the case the error is below a predetermined level, QPF data describing the quadratic polynomial is determined from the coefficients of the quadratic polynomial.

22 Claims, 8 Drawing Sheets

BEZIER SPLINE TO QUADRATIC POLYNOMIAL FRAGMENT CONVERSION

BACKGROUND

1. Field of the Invention

The present invention relates to the representation of curves in graphics systems and, in particular, describes a methods by which objects described by cubic polynomials can be converted into corresponding quadratic polynomial descriptions.

2. Description of the Related Art

Computerised graphics systems generally form an image based upon one or more graphic objects, each defining a particular shape, component or line in the image. Typically, each object is defined by an outline curve which defines the interior of the object which can be displayed, by varying the colour between the interior and the exterior of the outline curve the outline curve can itself define a portion of an objects structure.

One popular form of defining the outline of each object is a spline format and the most popular spline formats are various forms for parametric cubic polynomials, such as Bezier curves. Other types of cubic polynomials that can be used are Hermite and B-splines.

Although cubic polynomials have been used for a number of years to produce high quality graphic images, such images take a substantial time to calculate and display in view of the need to calculate the roots of a cubic polynomial in order to obtain the various pixel locations of the curve outline on each scan-line of the display, such as a video display unit or a printer.

Although current levels of technology are sufficient to produce hardware able to perform the necessary calculations required to display cubic polynomials in real-time for full video animation, such hardware is highly complex, expensive and therefore not readily accessible to consumer markets.

Reference is hereby made to the following patent specifications lodged concurrently herewith and the disclosure of which is hereby incorporated by cross-reference:

(i) U.S. patent application Ser. No. 08/053,373, filed Apr. 28, 1993, claiming priority from Australian Patent Application No. PL2147, filed Apr. 29, 1992, entitled "A Real-Time Object Based Graphics System";

(iv) U.S. patent application Ser. No. 08/053,363, filed Apr. 28, 1993, claiming priority from Australian Patent Application No. PL 2156, filed Apr. 29, 1992, entitled "Edge Calculation for Graphics Systems";

(v) U.S. patent application Ser. No. 08/053,378, filed Apr. 28, 1993, claiming priority from Australian Patent Application No. PL 2142, filed Apr. 29, 1992, entitled: "A Preprocessing Pipeline for RTO Graphics System";

(vi) U.S. patent application Ser. No. 08/053,231 claiming priority from Australian Patent Application No. PL 2145 Apr. 29, 1992, entitled "Object Sorting for Graphics Systems"; and (vii) U.S. patent application Ser. No. 08/053,219, filed Apr. 28, 1993, claiming priority from Australian Patent Application No. PL 2150, filed Apr. 29, 1992, entitled "Object Based Graphics Using Quadratic Polynomial Fragments".

In the above specifications it is proposed to use an alternative format for the representation of curve outline. Instead of using cubic polynomials, and cubic splines in particular, it is proposed to use quadratic polynomial fragments (QPF's). QPF's, in view of their representation being based upon quadratic polynomials as opposed to cubic polynomials, can be more easily calculated, preferably by two separate additions, and thereby permit the real-time calculation and rendering of object based images.

In this manner, a graphic object can be divided into a plurality of QPF's which define various portions of the object outline and from which the object edges can be calculated prior to display of the image.

As specifically described in Australian Patent Application No. PL 2150, filed Apr. 29, 1992, entitled "Object Based Graphics Using Quadratic Polynomial Fragments", a QPF can be described by the following QPF data components: START_PIXEL, $\Delta$PIXEL, $\Delta\Delta$PIXEL, START_LINE, and END_LINE. In this manner, such QPF data can be used to generate pixel location values (PIXEL) along the QPF between the START_LINE and END_LINE in the following manner:

PIXEL $(\text{line}_{n+1})$ = PIXEL $(\text{line}_n)$ + $\Delta$PIXEL $(\text{line}_n)$ $\Delta$PIXEL $(\text{line}_{n+1})$ = $\Delta$PIXEL $(\text{line}_n)$ + $\Delta\Delta$PIXEL where PIXEL $(\text{line}_n = \text{START\_LINE})$ = START_PIXEL; and $\Delta$PIXEL $(\text{line}_n = \text{START\_LINE})$ = $\Delta$PIXEL.

Because there currently exists large numbers of graphic objects described by cubic polynomials such as Bezier splines, it is desirable that a means be provided by which objects described in known spline formats can be converted into QPF's.

SUMMARY OF THE INVENTION

It is an object of the present invention to substantially overcome, or ameliorate at least one of the aforementioned difficulties with the prior art.

In accordance with a first aspect of the present invention there is disclosed a method for converting an object of a computerized graphics system described by a plurality of spline formats into a corresponding object described by a plurality of quadratic polynomial fragments (QPF), said method comprising, for each spline of said object, the steps of:

(a). selecting start and end points on said spline and designating same as corresponding start and end points on the corresponding QPF;

(b). determining from the control points of the spline, coefficients of the quadratic polynomial describing said QPF;

(c). using the coefficients to determine if an error between the spline and the quadratic polynomial is below a predetermined level; and (d). if so, determining from said coefficients, QPF data describing said quadratic polynomial.

If the error is not below the predetermined amount, then (e). the spline is divided into two or more sub-splines for which a corresponding quadratic polynomial is determined. This step is repeated if necessary until the error between each quadratic polynomial and the corresponding sub-spline is below the predetermined amount. The error can be an area error and/or an angle error.

In accordance with a second aspect of the present invention there is disclosed a method for converting an object of a computerized graphic system described by a plurality of spline formats into a corresponding object described by a plurality of quadratic polynomial fragments (QPF), said method comprising, for each spline of said object, the steps of:
- (a). selecting start and end points on said spline and designating same as corresponding start and end points for a plurality of QPF's on the corresponding QPF;
- (b). determining from the control points of the spline, coefficients of the quadratic polynomial describing each said QPF;
- (c). using the coefficients to determine if an error between the spline and the quadratic polynomials is below a predetermined level; and
- (d) if so, determining from said coefficients, QPF data describing said quadratic polynomials.

If the error is not below the predetermined amount, then

- (e). the spline is divided into two or more sub-splines for which a corresponding quadratic polynomial(s) is determined using steps (a) to (d) from either the first or second aspect. This step is repeated if necessary until the area error between each quadratic polynomial and the corresponding sub-spline is below the predetermined amount.

In accordance with another aspect of the present invention there is disclosed a computer system adapted for the conversion of spline-based graphic objects into quadratic polynomial fragments by means of the steps (a)–(d) above.

In accordance with another aspect of the present invention there is disclosed a memory device configured for the storage of graphic object data characterised in that said data comprises a plurality of quadratic polynomial fragments.

Preferably the error is an area error or an angle error, and most preferably both.

In accordance with another aspect of the present invention there is disclosed a method for convening an object of a computerized graphics system described by a plurality of spline formats into a corresponding object described by a plurality of quadratic polynomial fragments (QPF), said method comprising, for each spline of said object, the steps of:

determining a set of equations with corresponding variable values describing an error associated with the said splines and their corresponding QPFs, and optimizing said set of equations to determine a best set of variable values.

In accordance with another aspect of the present invention there is disclosed a method for converting a portion of an object of a computerized graphics system, said portion being described by a plurality of splines forming a closed loop, into a corresponding object described by a plurality of quadratic polynomial fragments (QPF), said method comprising the steps of:

(a) selecting a first spline of said closed loop and with said first spline:
- (i) selecting a QPF starting point corresponding to the starting point of a first spline,
- (ii) calculating a corresponding starting QPF having the same starting slope and same end slope as said spline,
- (iii) measuring the difference between the endpoint of said QPF and the end point of said first spline,
- (iv) if said difference is less than a predetermined tolerance, then accepting said starting QPF as a sufficiently accurate approximation to the first spline and proceeding with steps (b) and (c) for the other splines in the closed loop,
- (v) if said difference is not less than a predetermined tolerance, then splitting said first spline into at least two spline portions and applying step (a) to a first portion of said first spline, and steps (b) and (c) to the other portions, (b) with all the intermediate splines in said closed loop:
- (i) selecting an endpoint of a previously calculated QPF as the starting point of a current QPF,
- (ii) calculating a current QPF having the same starting slope and same end slope as the corresponding said intermediate spline,
- (iii) measuring the difference between the endpoint of said current QPF and the end point of said corresponding intermediate spline,
- (iv) if said difference is less than a predetermined tolerance, then accepting said current QPF as a sufficiently accurate approximation of the corresponding intermediate spline and proceeding with steps (b) and (c) for the other splines in the closed loop,
- (v) if said difference is not less than a predetermined tolerance, then splitting said current spline into at least two spline portions and performing steps (b) and (c) on said splines portions, and (c) with a final spline in said closed loop
- (i) selecting an endpoint of a previously calculated QPF as the starting point of a last QPF,
- (ii) calculating a last QPF having the same starting slope and same end point as said final spline,
- (iii) determining if a predetermined criteria is satisfied between said last QPF and said final spline,
- (iv) if said criteria is satisfied, then accepting said final QPF as a sufficiently accurate approximation to the final spline,
- (v) if said difference is not less than a predetermined tolerance, then splitting said final spline into at least two spline portions and performing steps (b) and (c) on said splines portions.

BRIEF DESCRIPTION OF THE DRAWINGS

Although the present invention is applicable to splines other than Bezier splines, a preferred embodiment of the present invention which relates to the conversion of Bezier splines to QPF's will now be described with reference to the drawings in which:

FIG. 8 is an illustration of the continuation of the third method of converting splines to QPFs.

DESCRIPTION OF THE PREFERRED EMBODIMENT

Figure 1:
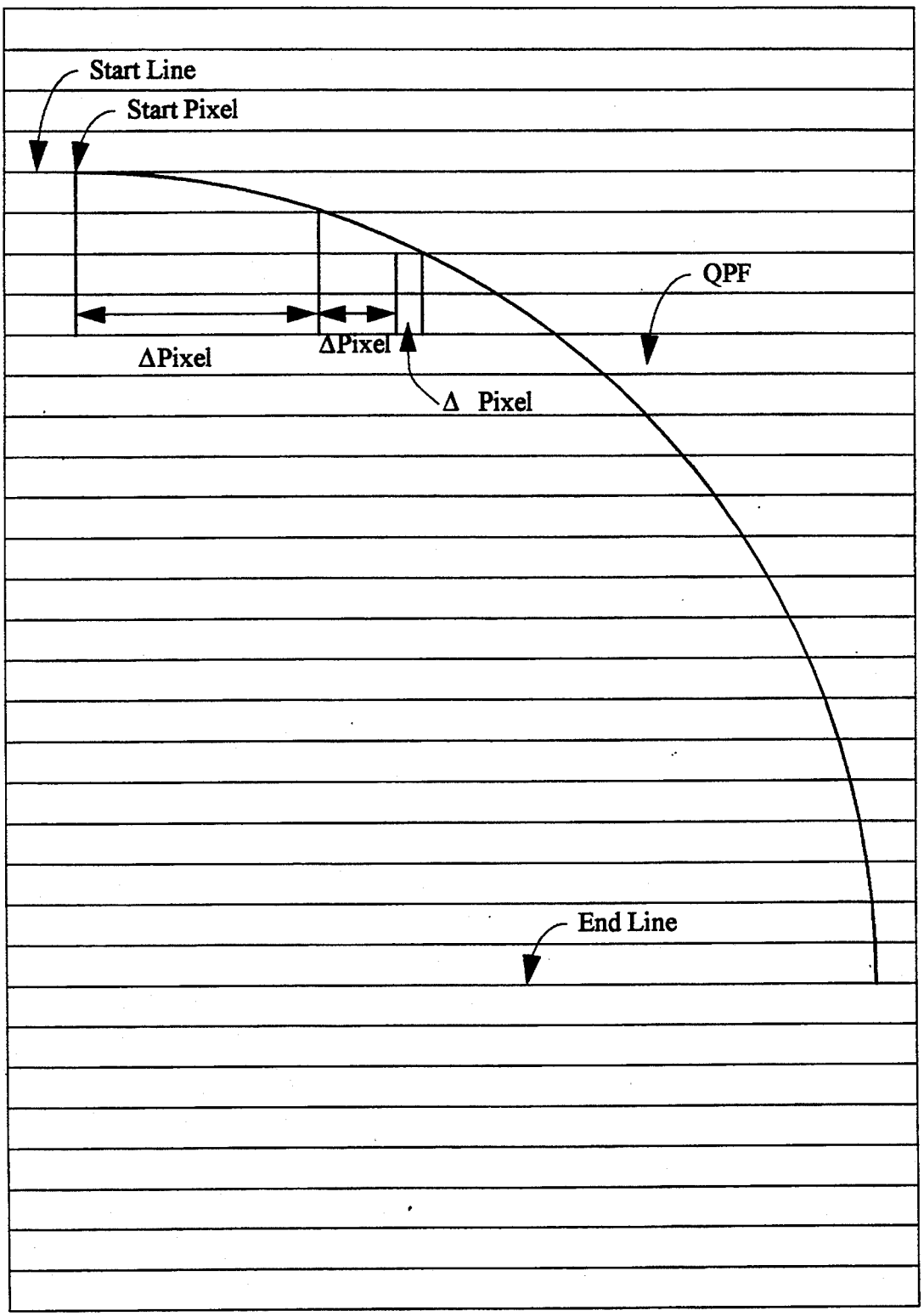
FIG. 1 is an illustration of a single QPF and the appropriate QPF data components used to describe the curve.

Referring to FIG. 1, a single QPF is shown illustrated which commences at a START_LINE at a START_PIXEL and extends to an END_LINE. The horizontal lines seen in FIG. 1, represent the scan lines of a display such as the raster lines of a video display unit or the scan lines of a printer. The QPF data is configured so that the value of each pixel on each line for a particular QPF can be calculated in the manner described earlier.

CURVE DEFINITION

Bezier splines, in general, are usually described by a parametric equation of the form:

$$\underline{r} = \underline{r}(u) = \underline{a_0} + u\underline{a_1} + u^2\underline{a_2} + u^3\underline{a_3} \quad \text{(EQ 1)}$$

This form can be used to independently determine x and y, via the parameter u, where u varies between 0 and 1.

$$\left. \begin{array}{l} x = p(u) \\ y = q(u) \end{array} \right\} 0 \leq u \leq 1 \quad \text{(EQ 2)}$$

For a cubic spline, the formulae are as given in Equation (3).

$$p(u) = x_0 + (-3x_0 + 3x_1)u + (3x_0 - 6x_1 + 3x_2)u^2 + \quad \text{(EQ 3)}$$
$$(-x_0 + 3x_1 - 3x_2 + x_3)u^3$$
$$q(u) = y_0 + (-3y_0 + 3y_1)u + (3y_0 - 6y_1 + 3y_2)u^2 +$$
$$(-y_0 + 3y_1 - 3y_2 + y_3)u^3$$

$$\left\{ \begin{array}{ll} p(0) = x_0 & q(0) = y_0 \\ p(1) = x_3 & q(1) = y_3 \end{array} \right\}$$

A Quadratic Polynomial Fragment (QPF) represents a section of a parabola. As such, its formula can be expressed as $$y = f(x) = ax^2 + bx + c \quad x_{start} \leq x \leq x_{end} \quad \text{(EQ 4)}$$

QPF's have been developed specifically, but not exclusively, for graphic object image rendering, using apparatus such as that disclosed in the herebefore cross-referenced Australian Patent Application No. PL2147, filed Apr. 29, 1992.

Accordingly, as the scan line progresses, the curve's new pixel value is calculated from the ΔPIXEL and ΔΔPIXEL values of the QPF. As such, for graphics systems, the more correct representation of Equation (4) is:

$$\text{pixel} = f(\text{line}) = a\,\text{line}^2 + b\,\text{line} + c \quad \text{(EQ 5)}$$

That is, x is taken to be the line direction, and y to be the pixel direction.

Note that if a is equal to zero, the QPF represents a straight line.

Furthermore, the Bezier Splines of the preferred embodiment are described using the standard 4 point format. That is $P_0(x_0,y_0)$ is the starting end-point, $P_1(x_1,y_1)$ and $P_2(x_2,y_2)$ are subsequent control points, and $P_3(x_3,y_3)$ is the finishing end-point. Also the preferred embodiment seeks to match QPF's to the spline that have both first and second order continuity. First order continuity is where two curves have coincident end points. Second order continuity is achieved where the end points are coincident and the curves have the same slope at the joining point.

A RECURSIVE CONVERSION METHOD

A preferred method for converting a spline to a QPF called a recursive conversion method will now be described.

CONVERSION REQUIREMENTS

In converting a spline to a QPF, the following attributes are desirable:

Identical End-Points

It is important that the start and end points of the spline and QPF be identical (to maintain first order continuity). This is shown by the relationship of Equation (6). Substituting Equation (4) into Equation (6) and solving simultaneously shows that b and c are linear in terms of a. This relationship is shown in Equation (7).

$$f(p(0)) = q(0) \rightarrow f(x_0) = y_0 \quad x_{start} = x_0 \quad \text{(EQ 6)}$$
$$f(p(1)) = q(1) \rightarrow f(x_3) = y_3 \quad x_{end} = x_3$$

$$b = -(x_0 + x_3)a + \frac{y_3 - y_0}{x_3 - x_0} \rightarrow b = b_1 a + b_2 \quad \text{(EQ 7)}$$

$$c = ax_0 x_3 + \frac{y_0 x_3 - x_0 y_3}{x_3 - x_0} \rightarrow c = c_1 a + c_2$$

Area Tolerance

The curves should follow similar paths. A tolerance measure must therefore be determined to measure the allowable deviation from the original path. Preferably, this tolerance should be defined in terms of errors that the eye can detect. Such a definition is extremely complex, however, because in some circumstances large deviations will be acceptable (e.g. if the deviation is smooth and doesn't flatten an edge which should be curved,) whereas in others even small deviations are unacceptable (e.g. if the small deviation is sharp, or flattens a slight curve.).

One method for controlling this error is to define the tolerance in terms of the allowable area between the original spline and the QPF. Because a small distance deviation from the original path will increase the accumulated area as the spline's length increases, this area tolerance must be taken on an area-per-unit-length basis.

Angle Tolerance

Second order continuity must be maintained in visual applications, as the eye is particularly sensitive to changes in gradient between lines. As a parabola does not have the same number of degrees of freedom as a spline, it is not guaranteed that a perfect match can be found for the gradients of the spline's endpoints in any single QPF. Consequently a tolerance for angle deviation is necessary in the conversion. Note that this must be angle deviation, not gradient deviation, as some slopes have zero or infinite gradients.

Flatness Tolerance

The conversion algorithm should attempt to minimise the number of QPFs required to represent a spline. This requirement can be facilitated by the introduction of a flatness tolerance. That is, a measure of the spline's deviation from a straight line can be made. If this deviation is smaller than the specified tolerance, the spline is considered to be a straight line, and is therefore converted to a single, linear, QPF.

Coefficient Limits

QPFs are designed to be rendered in real time by the calculation of ΔPixel and ΔΔPixel values. Any hardware doing these calculations will have limits on the values that these variables can take; these limits will be defined by the size of internal registers. For example, in the apparatus of Australian Patent Application No. PL2147, filed of Apr. 29, 1992, ΔPixel must be in the range −128 to +127.996093750, while ΔΔPixel must be in the range −0.5 to +0.499984741.

The ΔPixel limit imposes the maximum slope that can be matched. Beyond this limit, the line must be considered vertical, and therefore discarded.

The ΔPixel limit imposes a limit on the value of the matching parabola's a coefficient. Given a QPF defined as in Equation (5), ΔΔPixel is given by:

$$\frac{d^2 \text{pixel}}{d \text{ line}^2} = 2a \quad \text{(EQ 8)}$$

For the apparatus Australian Patent Application No. PL2147 of 29th Apr., 1992, therefore, a is limited to the range −0.25 to +0.249992371.

THE GENERAL CONVERSION PROCESS

From the requirements as previously outlined, a general conversion process can be created. This process is as follows:

```
IF The spline is flat (within the specified tolerance)
THEN
    Convert it to a linear QPF
ELSE
    Match one or more parabola(s) to the spline, maintaining
    first-order continuity, and the limits of a.
    IF The area error and angle errors are within tolerance
    THEN
        Convert the parabola(s) to QPF(s).
    ELSE
        Split the spline, and repeat the above for each end
        individually.
    ENDIF
ENDIF
```

MATCHING PARABOLAS TO THE SPLINE

When matching parabolas to a spline, there is no reason why it must be matched with only one parabola; in fact, this gives unsatisfactory results most of the time. In general, better results can be obtained by matching more than one parabola, but the mathematics makes the procedure very computer-intensive if more than two parabolas are used.

Therefore, if a one-parabola or two-parabola match cannot be found, the spline is preferably split into sub-splines, and the sub-splines converted.

MATCHING A SINGLE PARABOLA MINIMIZING THE VISUAL AREA ERROR

Figure 2:
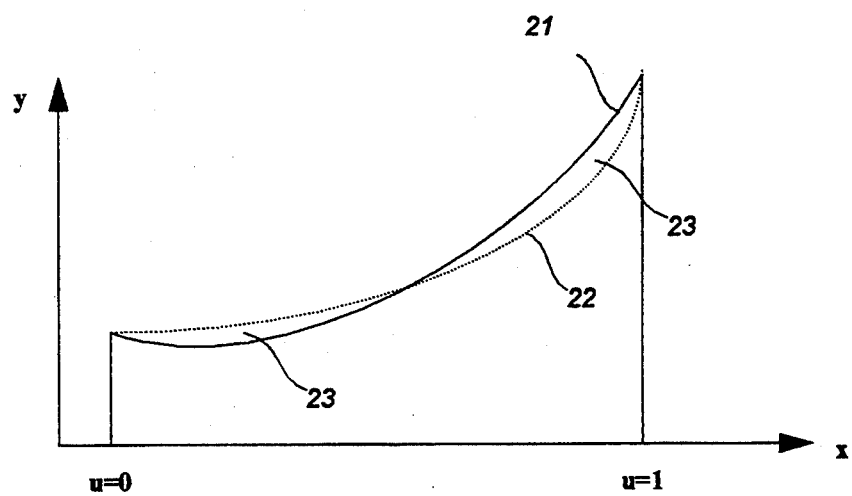
FIG. 2 illustrates the area difference between a spline and its corresponding QPF.

Referring now to FIG. 2, there is shown one way of describing how well a QPF 22 fits a spline 21, is to find the area under the spline and subtract the area under the QPF.

This area difference 23 between the curves is preferably squared to keep the resulting area measure at all times positive, resulting in a mean squared error term in Equation (9).

$$E_{Area} = \int_0^1 [f(p(u)) - q(u)]^2 du \quad \text{(EQ 9)}$$

Equation (9) can be represented in terms of a, b, and c by substituting Equation (4) as follows:

$$E_{Area} = \int_0^1 [ap(u)^2 + bp(u) + c - q(u)]^2 du \quad \text{(EQ 10)}$$

Expanding Equation (10) and representing in terms of a, b, and c gives:

$$E_{Area} = a^2 \int_0^1 p(u)^4 du + 2ab \int_0^1 p(u)^3 du + \quad \text{(EQ 11)}$$

$$(b^2 + 2ac) \int_0^1 p(u)^2 du + 2bc \int_0^1 p(u) du + \int_0^1 q(u)^2 du -$$

$$2c \int_0^1 q(u) du - 2a \int_0^1 p(u)^2 q(u) du - 2b \int_0^1 p(u) q(u) du + c^2$$

Collecting the integral values then, the error term becomes:

$$E_{Area} = a^2 I_1 = 2ab I_2 + (b^2 + 2ac) I_3 + 2bc I_4 + \quad \text{(EQ 12)}$$

$$I_5 - 2c I_6 - 2a I_7 - 2b I_8 + c^2$$

where $$I_1 = \int_0^1 p(u)^4 du$$

$$I_2 = \int_0^1 p(u)^3 du$$

$$I_3 = \int_0^1 p(u)^2 du$$

$$I_4 = \int_0^1 p(u) du$$

$$I_5 = \int_0^1 q(u)^2 du$$

$$I_6 = \int_0^1 q(u) du$$

$$I_7 = \int_0^1 p(u)^2 q(u) du$$

$$I_8 = \int_0^1 p(u)q(u)du$$

Equation (7) can be applied to Equation (12) to show that the error term is a quadratic in a which can then be minimised to find the value of a that will produce the smallest area error.

$$E_{Area} = (I_1 + 2b_1I_2 + 2c_1I_3 + 2b_1c_1I_4 + \qquad \text{(EQ 13)}$$

$$c_1^2 + b_1^2I_3)a^2 + (2c_1c_2 + 2b_2I_2 + 2b_1b_2I_3 + 2c_2I_3 + 2b_1c_2I_4 +$$

$$2b_2c_1I_4 - 2c_1I_6 - 2I_7 - 2b_1I_8)a +$$

$$(c_2^2 + b_2^2I_3 + 2b_2c_2I_4 + I_5 - 2c_2I_6 - 2b_2I_8)$$

$$\therefore E_{Area} = \alpha a^2 + \beta a + \gamma$$

$$\text{minimising} \longrightarrow \frac{dE}{da} = 2\alpha a + \beta = 0$$

$$a = \frac{-\beta}{2\alpha}$$

Equation (13) is a general area error term for any spline and parabola whose start and end points match. However the computation is very intensive for each of the integral terms. A way of avoiding some of this processing to calculate the error term is to translate the spline so that its start point is at the origin. Once the matching parabola is found, it can be translated back to the original spline position. With the starting point of the spline at the origin, the following relations then become true:

$$x_0 = y_0 = 0 \qquad \text{(EQ 14)}$$

$$b = -x_3a + \frac{y_3}{x_3} \quad c = 0 \quad b_1 = -x_3 \quad b_2 = \frac{y_3}{x_3}$$

$$\therefore E_{Area} = a^2I_1 + 2abI_2 + b^2I_3 + I_5 - 2aI_7 - 2bI_8$$
$$\alpha = I_1 + 2b_1I_2 + b_1^2I_3$$
$$\beta = 2b_2I_2 + 2b_1b_2I_3 - 2I_7 - 2b_1I_8$$
$$\gamma = b_2^2I_3 + I_5 - 2b_2I_8$$

Symbolic evaluation of the integrals, and simplifying the expressions results in Equation (15), Equation (16) and Equation (17), which define $\alpha$, $\beta$ and $\gamma$ in terms of the control points of the spline.

$$\alpha_1 = 28x_1^4 + 70x_1^3x_2 + 90x_1^2x_2^2 + 70x_1x_2^3 + \qquad \text{(EQ 15)}$$

$$28x_2^4 - 123x_1^3x_3 - 216x_1^2x_2x_3 - 174x_1x_2^2x_3 - 59x_2^3x_3$$

$$\alpha_2 = 114x_1^2x_3^2 + 84x_1x_2x_3^2 -$$

$$3x_2^2x_3^2 + 47x_1x_3^3 + 44x_2x_3^3 + 44x_3^4$$

$$\alpha = \frac{9(\alpha_1 + \alpha_2)}{20020}$$

$$60x_1x_3^2y_1 + \beta_1 = -27x_1^2x_3y_1 - 36x_1x_2x_3y_1 - 18x_2^2x_3y_1 \qquad \text{(EQ 16)}$$
$$+$$

$$36x_2x_3^2y_1 + 17x_3^3y_1 - 18x_1^2x_3y_2 - 36x_1x_2x_3y_2$$

$$\beta_2 = -27x_2^2x_3y_2 + 36x_1x_3^2y_2 + 30x_2x_3^2y_2 + 32x_3^3y_2 +$$

$$27x_1^3y_3 + 54x_1^2x_2y_3 + 54x_1x_2^2y_3 + 27x_2^3y_3$$

$$\beta_3 = -60x_1^2x_3y_3 - 72x_1x_2x_3y_3 -$$

$$30x_2^2x_3y_3 - 17x_1x_3^2y_3 - 32x_2x_3^2y_3$$

$$\beta = \frac{\beta_1 + \beta_2 + \beta_3}{420x_3}$$

$$\gamma_1 = 2x_3^2y_1^2 + 3x_3^2y_1y_2 + 2x_3^2y_2^2 - \qquad \text{(EQ 17)}$$

$$4x_1x_3y_1y_3 - 3x_2x_3y_1y_3$$

$$\gamma_2 = -3x_1x_3y_2y_3 - 4x_2x_3y_2y_3 + 2x_1^2y_3^2 + 3x_1x_2y_3^2 + 2x_2^2y_3^2$$

$$\gamma = \frac{3(\gamma_1 + \gamma_2)}{70x_3^2}$$

Once $\alpha$, $\beta$ and $\gamma$ are known, Equation (13) can be used to calculate a for the minimum-area parabola. If a is outside the allowed limits (see the previous discussion entitled Coefficient Limits) it should be set to the nearest limit.

Once a is known, the area error can be calculated. The error term is absolute, and should be divided by the length of the spline to yield a relative error. If the error is acceptable (within a predetermined tolerance), then the parabola (Equation (14) gives b and c in terms of a) is a good fit, and can be used to generate the QPF (remembering to translate the parabola back to the original starting position). If the area is not acceptable, the original spline (untranslated) can be split into sub-splines, and the conversion procedure can be carried out recursively on each sub-spline. An example procedure for splitting splines is to take the position parametrically halfway down the spline ($u=\frac{1}{2}$), although an alternative approach can be to split at the points of inflection or some other heuristic.

The pseudocode for this process is as follows:

```
parabola = Calc_MinError_Parabola(spline)
IF a is outside the limits
THEN
    Move a to the nearest limit.
ENDIF
area_err = Calc_Min_Area_Error(spline, parabola) / Length
(spline)
IF area_err < area_tolerance
    Found_QPF(parabola)
ELSE
    Split_And_Convert(spline)
FI
```

AN ALTERNATIVE AREA MINIMIZATION METHOD

While the minimisation of the visual area, as described above, is the most correct approach to area minimisation, the mathematics behind it are complex, and the conversion process is therefore computationally expensive. An alternative method exists which simplifies the mathematics by providing a simplified error measure.

This method involves converting the parabola to a spline, and minimising the area between the "y" curve of the original spline, and the "y" curve of the new, parabolic spline. Errors between the "x" curves are ignored, so this approach is not as correct as the visual area approach. It does, however, produce acceptable results with a reduced computation time.

It can be shown that, given a section of a parabola thus:

$$y = ax^2 + bx + c \text{ where } x_a \leq x \leq x_b \qquad \text{(EQ 18)}$$

an equivalent spline can be identified with four points thus:

$$x_{q0} = x_a \quad \text{(EQ 19)}$$

$$y_{q0} = y_a = ax^2_a + bx_a + c \quad \text{(EQ 20)}$$

$$x_{q1} = \frac{2x_{q0} + x_{q3}}{3} \quad \text{(EQ 21)}$$

$$y_{q1} = \frac{2a(x_{q3} - x_{q0})x_{q0} + b(x_{q3} - x_{q0}) + 3y_{q0}}{3} \quad \text{(EQ 22)}$$

$$x_{q2} = \frac{2x_{q3} + x_{q0}}{3} \quad \text{(EQ 23)}$$

$$y_{q2} = \frac{a(x_{q3} - x_{q0})^2 - 3y_{q0} + 6y_{q1}}{3} \quad \text{(EQ 24)}$$

$$x_{q3} = x_b \quad \text{(EQ 25)}$$

$$y_{q3} = y_b = y_{q0} - 3y_{q1} + 3y_{q2} = ax_b^2 + bx_b + c \quad \text{(EQ 26)}$$

Given the spline equivalent of a parabola, an error term can be calculated in an equivalent manner to the error given in Equation (9), i.e.:

$$E_{Area} = \int_0^1 [q_q(u) - q(u)]^2 du \quad \text{(EQ 27)}$$

where, q(u) is the spline's y equation as given in Equation (3), and $$q_q(u) = y_{q0} + (-3y_{q0} + 3y_{q1})u + (3y_{q0} - 6y_{q1} + 3y_{q1})u^2 + (-y_{q0} + 3y_{q1} - 3y_{q2} + y_{q3})u^3 \quad \text{(EQ 28)}$$

Evaluation of this integral results in an error value equal to:

$$a^2 \left( \frac{x_0^4}{30} - \frac{2x_0^3 x_3}{15} + \frac{x_0^2 x_3^2}{5} - \frac{2x_0 x_3^3}{15} + \frac{x_3^4}{30} \right) + \quad \text{(EQ 29)}$$

$$a \left( \frac{-x_0^2 y_0}{10} + \frac{x_0 x_3 y_0}{5} - \frac{x_3^2 y_0}{10} + \frac{x_0^2 y_1}{10} - \right.$$

$$\left. \frac{x_0 x_3 y_1}{5} + \frac{x_3^2 y_1}{10} \right) + a \left( \frac{x_0^2 y_2}{10} - \frac{x_0 x_3 y_2}{5} + \right.$$

$$\left. \frac{x_3^2 y_2}{10} - \frac{x_0^2 y_3}{10} + \frac{x_0 x_3 y_3}{5} - \frac{x_3^2 y_3}{10} \right) +$$

$$\left( \frac{8y_0^2}{105} - \frac{11 y_0 y_1}{70} + \frac{3y_1^2}{35} - \frac{y_0 y_2}{7} + \frac{9 y_1 y_2}{70} + \right.$$

$$\left. \frac{3y_2^2}{35} + \frac{31 y_0 y_3}{210} - \frac{y_1 y_3}{7} - \frac{11 y_2 y_3}{70} + \frac{8y_3^2}{105} \right)$$

This error term can be simplified by translating the spline and the parabola to the origin, thereby setting $x_0$ and $y_0$ to zero. The result is:

$$a^2 \frac{x_3^4}{30} + a \left( \frac{x_3^2 y_1}{10} + \frac{x_3^2 y_2}{10} - \frac{x_3^2 y_3}{10} \right) + \quad \text{(EQ 30)}$$

$$\left( \frac{3y_1^2}{35} + \frac{9 y_1 y_2}{70} + \frac{3y_2^2}{35} - \frac{y_1 y_3}{7} - \frac{11 y_2 y_3}{7} 0 + \frac{8y_3^2}{105} \right)$$

If the derivative of the area error with respect to a is equated to zero, the value of a which minimises the area difference results. This value is given by:

$$a = \frac{3(y_0 - y_1 - y_2 + y_3)}{2(x_0 - x_3)^2} \quad \text{(EQ 31)}$$

If the parabola is translated to the origin, this becomes:

$$a = \frac{3(-y_1 - y_2 + y_3)}{2x_3^2} \quad \text{(EQ 32)}$$

Once the value of a is found, the area error can be calculated by the use of Equation (29) or Equation (30). If the area error is within tolerance, it is a straight-forward exercise to evaluate the values of b and c, given the fact that the parabola has the given a, and passes through the points $(x_a, y_a)$ and $(x_b, y_b)$.

MAINTAINING SECOND-ORDER CONTINUITY

When matching a single parabola to a spline, three degrees of freedom are available. These are the parabola's a, b and c coefficients. By imposing the two constraints "both endpoints must match", the degrees of freedom are reduced to 1. It is possible, therefore to impose one extra constraint. As described above, this is taken to be "minimise the area error."

Further constraints cannot be imposed, therefore. In particular, constraints on the slope of the parabola at the spline's end-points cannot be imposed.

As a result, the "minimum area" parabola obtained by either of the above methods may not be the best visual match because it may not have a tolerable second order continuity. The conversion algorithm can also account for angle differences by the use of an angle tolerance.

The difference is preferably measured in degrees, not in terms of the slope. This is because small slope differences translate into large angle differences at low angles (near 0 degrees,) while large slope differences translate into small angle differences as the angle approaches 90 degrees.

To maintain second order continuity, therefore, the angles at the start and end points of the spline and parabola must match within a specified tolerance. The pseudocode for determining if the start angle is within a tolerance can be described as:

```
spline_angle = Calculate angle the spline's tangent at P0 makes
               with the horizontal
parabola_angle = Calculate the angle the parabola's tangent at
                 point P0 makes with the horizontal
IF The absolute value of (spline_angle - parabola_angle) is
   below the angle tolerance
THEN
    return TRUE
ELSE
    return FALSE
ENDIF
```

A similar check should be made at the spline's finishing point.

If the spline has matched the area tolerance, but fails the angle tolerance at either end, it may be possible to adjust the angles to be within tolerance while the (albeit increased) area error remains within the area tolerance. This is achieved by choosing the end point which exhibits the larger angle error, and moving the parabola's angle towards the spline until it comes within tolerance. At this point, a new parabola is calculated in the following manner:

Given that the parabola must pass through two points $x_a, y_a$ and $(x_b, Y_b)$, and the slope of the parabola at $(x_a, y_a)$ is $m_a$, then this results in:

$$y_a = ax_a^2 + bx_a + c \quad \text{(EQ 33)}$$

$$y_b = ax_b^2 + bx_b + c \quad \text{(EQ 34)}$$

$$m_a = \tan(\text{angle at } x_a) = 2ax_a + b \quad \text{(EQ 35)}$$

Solving these simultaneously gives:

$$a = \frac{y_b - y_a - m_a(x_b - x_a)}{(x_b - x_a)^2} \quad \text{(EQ 36)}$$

$$b = m_a - 2ax_a \quad \text{(EQ 37)}$$

$$c = y_a - ax_a^2 - bx_a \quad \text{(EQ 38)}$$

The new parabola can then be checked for its angle and area errors. If it is within tolerance, it is accepted. If not, the spline is split as described previously in the section entitled Minimising the Visual Area Error.

MATCHING TWO PARABOLAS

Referring now to FIG. 2, them is shown shows a single parabola QPF 22 matched to a single spline 21.

Figure 3:
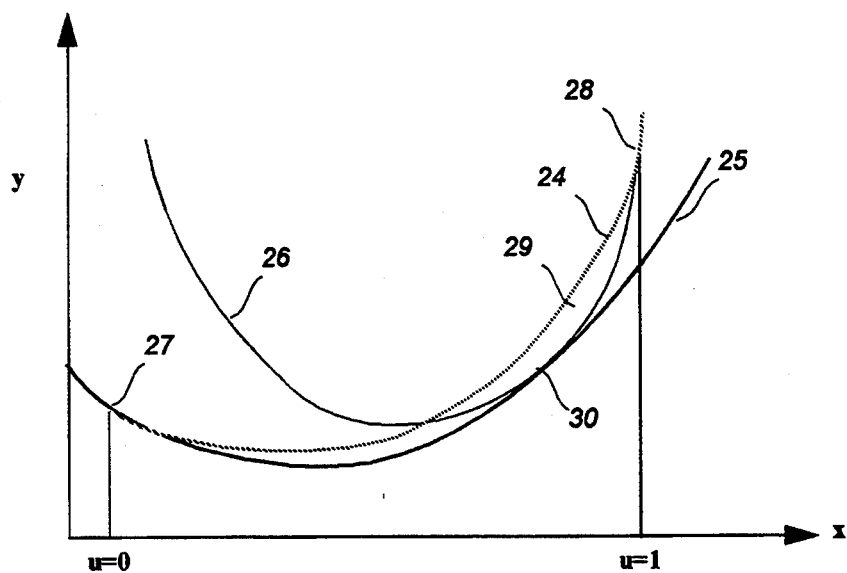
FIG. 3 is similar to FIG. 2 but shows the matching of two parabolas to a single spline.

Referring now to FIG. 3, there is shown two parabolas QPF1 25, QPF2 26 which can be similarly matched to the spline 24.

When matching two parabolas, seven degrees of freedom are gained: the a, b and c coefficients of each parabola, and the x-coordinate of the point where they join 30. The following constraints can therefore be applied while leaving one degree of freedom:
 first end-point 27 must match,
 the slope at first end-point 27 must match,
 second end-point 28 must match,
 the slope at the second end-point 28 must match,
 both parabolas must meet at the designated joining x-coordinate 30, and
 the slopes of the parabolas must match at the joining point.

In other words, constraints can be imposed which guarantee second-order continuity for the matching parabolas. At the same, time, one degree of freedom remains to allow area error 29 to be minimised.

If the degree of freedom is exercised by choosing the x-coordinate ($x_{join}$) of the point at which the parabolas meet 30, then the above constraints can be expressed mathematically as set out below:

If the two end-points are $(x_a, y_a)$ and $(x_b, y_b)$, and each has a slope of $m_a$ and $m_b$ respectively, then:

$$y_a = a_0 x_a^2 + b_0 x_a + c_0 \quad \text{(EQ 39)}$$

$$m_a = \left.\frac{dy_0}{dx}\right|_{x=x_a} = 2a_0 x_a + b_0 \quad \text{(EQ 40)}$$

$$y_b = a_1 x_b^2 + b_1 x_b + c_1 \quad \text{(EQ 41)}$$

$$m_b = \left.\frac{dy_1}{dx}\right|_{x=x_b} = 2a_1 x_b + b_1 \quad \text{(EQ 42)}$$

$$y_{join} = a_0 x_{join}^2 + b_0 x_{join} + c_0 \quad \text{(EQ 43)}$$

$$y_{join} = a_1 x_{join}^2 + b_1 x_{join} + c_1 \quad \text{(EQ 44)}$$

$$\left.\frac{dy_0}{dx}\right|_{x=x_{join}} = 2a_0 x_{join} + b_0 = \left.\frac{dy_1}{dx}\right|_{x=x_{join}} = 2a_1 x_{join} + b_1 \quad \text{(EQ 45)}$$

By solving the above simultaneous equations, it can be shown that:

$$y_{join} = \frac{2y_a(x_n - x_{join}) + 2y_b(x_{join} - x_a) + (m_a - m_b)(x_b - x_{join})(x_{joi} - x_a)}{2(x_b - x_a)} \quad \text{(EQ 46)}$$

$$a_0 = \frac{y_{join} - y_a - (x_{join} - x_a)m_a}{(x_{join} - x_a)^2} \quad \text{(EQ 47)}$$

$$b_0 = m_a - 2x_a a_0 \quad \text{(EQ 48)}$$

$$c_0 = y_a - x_a m_a + x_a^2 a_0 \quad \text{(EQ 49)}$$

$$a_1 = \frac{y_{join} - y_b - (x_{join} - x_b)m_b}{(x_{join} - x_b)^2} \quad \text{(EQ 50)}$$

$$b_1 = m_b - 2x_b a_1 \quad \text{(EQ 51)}$$

$$c_1 = y_b - x_b m_b + x_b^2 a_1 \quad \text{(EQ 52)}$$

Note that the above solutions are valid for every value of $x_{join}$ between (but not including) $x_a$ and $x_b$. In other words, any x-coordinate between the two endpoints can be chosen as a joining point. This is equivalent to saying that the join can be made at the spline's x-coordinate given by any value of u between 0 and 1 (not inclusive.)

MINIMIZING THE AREA

Once the two parabolas are found, the area error between them and the original spline can be calculated. This can be done by either the methods described previously entitled Minimising the Visual Area Error or the method entitled an Alternative Area Minimization Note that the mathematics of the area error calculations is made easier if the spline 24 is also split in two at a value of u corresponding to $x_{join}$. In this way, the single-parabola formulae can be used to calculate the area error for each split; the results can then be added. The formulae for splitting the spline will be outlined below.

The optimal value chosen for $x_{join}$ is the one which minimises the area error. The complexity of the mathematics behind such a solution means that simplified numerical methods for the discovery of an approximate minimum are best used. For example of a simplified numerical method, the area error can be calculated for $x_{join}$ corresponding to values of u of 0.1, 0.2, ... 0.8, 0.9 and the minimum of these values can then be chosen.

MATCHING MORE THAN TWO PARABOLAS

In a manner similar to that used to match two parabolas to the spline, more than two parabolas can be matched by:
 guaranteeing that the slopes at the spline's end-points match, and adjusting the joining points of the parabolas between the spline's end-points.

While this is possible, the mathematics involved is quite complex due to the number of degrees of freedom available (i.e. the position of all of the joining points.) The search for an optimal solution requires the use of a long, computationally-intensive numerical optimization method. Although one such method will be discussed hereinafter, in the present method, if the two-parabola approach does not yield a suitable result, the spline is split, and the subsequent splines are matched.

THE RECURSIVE CONVERSION METHOD

Given the above, the recursive conversion algorithm can be developed as follows:

```
IF The spline is within the flatness tolerance.
THEN
    Convert it to a straight line joining the end points.
    Return
ENDIF
Calculate minimum-area single parabola for spline (i.e. α, β, γ, a and b)
IF a is outside its allowable limits
THEN
    set a to the nearest limit
ENDIF
Calculate the area error term between the resultant parabola and the spline
IF the area is not within the area tolerance
THEN
    A two-parabola match is required
ELSE
    Calculate the start and end angles for spline and parabola
    IF start and end angles are within tolerance
    THEN
        Convert parabola to QPF
        A two-parabola match is not required.
    ELSE
        IF the angle at p3 deviates by more than the angle at p0
        THEN
            Calculate a new parabola based on p0 and p3, with the angle at p3 being the spline's p3-angle, offset by the angle tolerance
            IF the new parabola has a within limits, has a good angle at p0, and has a good area error
            THEN
                Convert the new parabola to a QPF.
                A two-parabola match is not required.
            ELSE
                A two-parabola match is required.
            ENDIF
        ELSE
            Calculate a new parabola based on p0 and p3, with the angle at p0 being the spline's p0-angle, offset by the angle tolerance
            IF the new parabola has a within limits, has a good angle at p3, and has a good area error
            THEN
                Convert the new parabola to a QPF.
                A two-parabola match is not required.
            ELSE
                A two-parabola match is required.
            ENDIF
        ENDIF
    ENDIF
ENDIF
IF a two-parabola match is required
THEN
    FOR u = 0.1, 0.2, 0.3, 0.4, 0.5, 0.6, 0.7, 0.8, 0.9 (for example)
    DO
        Calculate the spline's x-coordinate ($x_s$) for the current value of u.
        Calculate the two parabolas which match the spline and join at $x_s$
        Calculate the area error between the splines and the parabolas.
        IF The value of a for each parabola is within limits
        AND The area error is within the allowed tolerance
        THEN
            Record that a suitable two-parabola match has been found.
            IF The area error is better than any match found thus far
            THEN
                Install the current match as the optimum match
            ENDIF
        ELSE
            IF No suitable two-parabola match has been found yet AND The area error is better than any error found thus far
            THEN
                Install the current parabolas as the closest contender.
            ENDIF
        ENDIF
    DONE
ENDIF
IF A suitable two-parabola match was found
THEN
    Convert the parabolas to QPFs.
ELSE
    Split the spline at the value of u which resulted in the closest contender.
    Reiterate the whole process to convert each sub-spline separately.
ENDIF
```

SPLITTING A SPLINE

In order to implement the spline to QPF conversion, it is necessary in many places to split a spline. For example:

if no suitable match can be made, the spline is to be split, and the sub-splines matched.

when evaluating the area error of a two-parabola match, the calculation is simplified if the original spline is split at the parabolas' joining point.

To do this, a formula is needed for splitting a spline into two sub-splines. It can be shown that if a given spline defined by points $(x_0,y_0)$, $(x_1,y_1)$, $(x_2,y_2)$ and $(x_3,y_3)$ is split at a given value of u, then the two sub-splines are in themselves Bezier Splines. The first sub-spline is defined by points $(x_{a0},y_{a0})$, $(x_{a1},y_{a1})$, $(x_{a2},y_{a2})$ and $x_{a3},y_{a3})$, and the second by points $(x_{b0},y_{b0})$, $(x_{b1},y_{b1})$, $(x_{b2},y_{b2})$ and $(x_{b3},y_{b3})$, where:

$$x_{a0}=x_0 \tag{EQ 53}$$

$$x_{a1}=(1-u)x_0+ux_1 \tag{EQ 54}$$

$$x_{a2}=(1-u)^2 x_0+2u(1-u)x_1+u^2 x_2 \tag{EQ 55}$$

$$x_{a3}(1-u)^3 x_0=+3u(1-u)^2 x_1+3u^2(1-u)x_2+u^3 x_3=x_{b0} \tag{EQ 56}$$

$$x_{b0}=(1-u)^3 x_0+3u(1-u)^2 x_1+3u^2(1-u)x_2+u^3 x_3=x_{a3} \tag{EQ 57}$$

$$x_{b1}=(1-u)^2 x_1+2u(1-u)x_2+u^2 x_3 \tag{EQ 58}$$

$$x_{b2}=(1-u)x_2+u^2 x_3 \tag{EQ 59}$$

$$x_{b3}=x_3 \tag{EQ 60}$$

with a similar calculation being carried out for y.

OBJECT CONVERSION USING OPTIMIZATION METHOD

As mentioned previously, in computer based graphics system each object is normally made up of a collection of splines that form the outline of a particular object. By way of example, a character in a series of characters is normally stored as a series of splines laid out so that the overall form of that character conforms to a particular font, with slight variations in the splines resulting in changes in the font. Although the present embodiment is particularly useful in dealing with splines making up character fonts, it is not limited thereto.

A system using QPF's to render a particular image is likely to have limited storage capabilities and a limited capacity to deal with a finite number of QPF's at any particular time. It is therefore important when converting splines to QPF's to ensure that the number of QPF's created for each graphics object is kept at a minimum. The present method is best used when storage space is to be minimized and computational time is available to compute a satisfactory solution.

As can be seen from Equation (3) the x and y values for a generic spline can be expressed in the form:

$$x = p(u) = lu^3 + mu^2 + nu + p \quad \text{(EQ 61)}$$

$$y = q(u) = eu^3 + fu^2 + gu + h \quad \text{(EQ 62)}$$

and a QPF takes the form as expressed in Equation (4)

Assuming that the overall object is to be rendered on a x-y plane the spline format is particularly advantageous as multiple values of y can exist for a given value of x and vica-versa so curves such as circles and ellipses can be easily rendered.

In using QPF's to approximate splines, it is not possible with a QPF to get multiple values of y for a single value of x and so curves such as circles and ellipses must be represented by multiple QPF segments.

One method for solving this problem when converting a spline to corresponding QPF's is to consider the turning points of the spline function with x with respect to u. These turning points occurs at the solution to the equation:

$$\frac{d}{du} p(u) = 0 \rightarrow 3lu^2 + 2mu + p = 0 \quad \text{(EQ 63)}$$

The solutions to this equation are the values of the parameter u where the spline undergoes a turning point with respect to u. Equation (63) has up to two distinct solutions, which means that a spline can not contain more than two turning points with respect to x. Thus a given spline can be built with a maximum of three one valued functions of x. It is therefore possible to split a the given spline into branches that are, by themselves, one value functions of x by splitting the spline at its turning points. For the purposes of the present method, it is assumed that this process is carried out so that Equation (61) and Equation (62) correspond to a spline that forms a one value function of x.

A good criteria to approximate a spline with a QPF is actually trying to minimize the distance between the ordinates of the points with the same abscissa. However, in most of the cases, only one QPF is not adequate to get a good result.

It is therefore appropriate to formulate the solution of the problem in a more general way considering the approximation of a spline with N QPFs.

Figure 4:
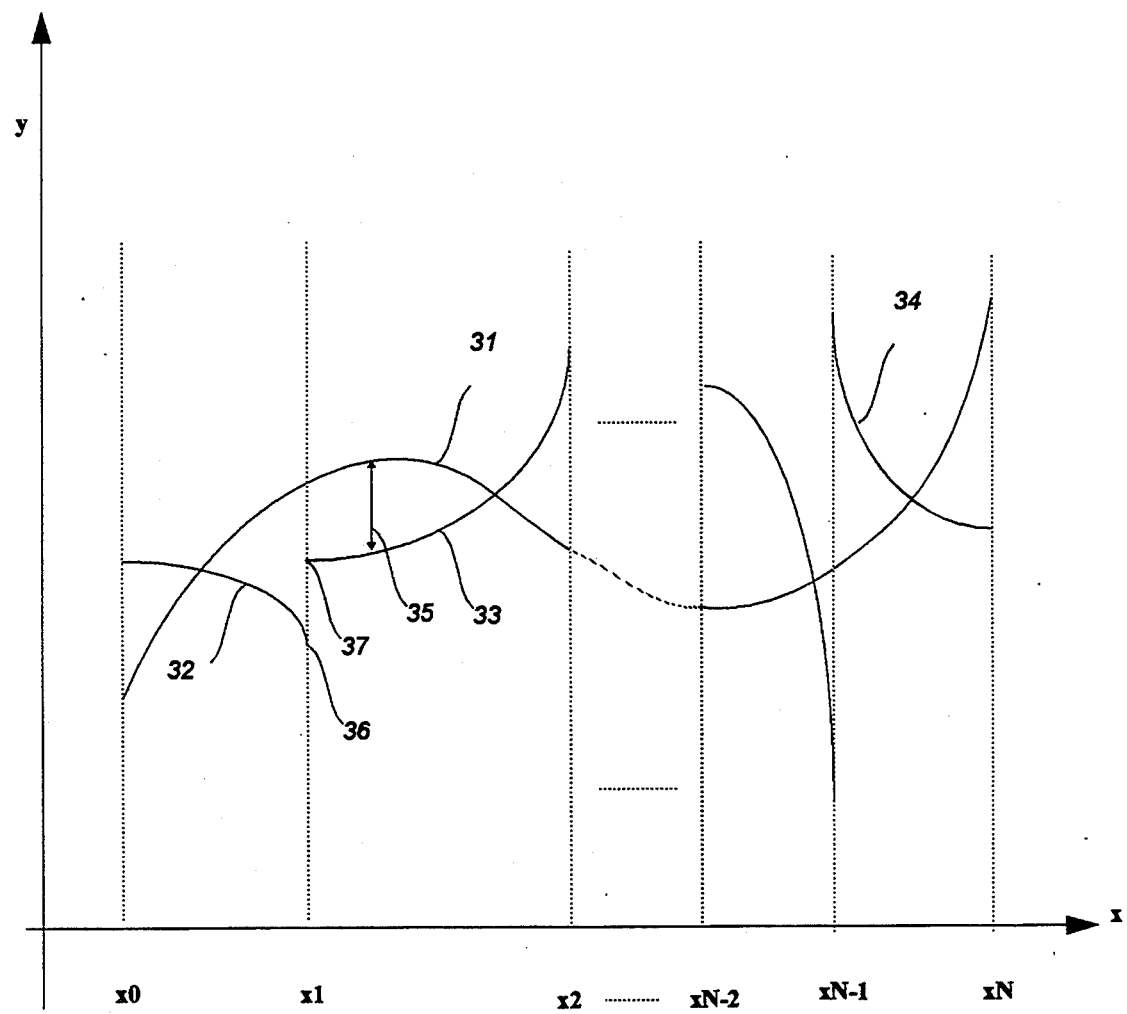
FIG. 4 illustrates the process of fitting N QPF's to a portion of a spline.

Referring now to FIG. 4, there is shown the general case of spline 31 which is to be approximated by N QPF's 32, 33, 34 etc.

Each QPF is of the form:

$$f_i(x) = m_i x^2 + n_i x + o_i \quad \text{(EQ 64)}$$

with $i \in \{0, \ldots, N-1\}$, $x \in [x_i, x_{i+1}]$ and $$p(u_a) = x_0 < x_1 < \ldots < x_i < \ldots < x_{N-1} < x_N = p(u_b) \quad \text{(EQ 65)}$$

Now we can define a difference measure 35 between the spline and one of the N QPFs, by determining for a particular value of x, the y value of the spline 31, by first taking the inverse being:

$$u = p^{-1}(x) \quad \text{(EQ 66)}$$

and the using Equation (62) to determine y. Difference measure 35 can then be defined as $$(f_i(x) - q(p^{-1}(x)))^2 \quad \text{(EQ 67)}$$

A measure of the area error between the spline and the QPF's can then be defined in similar terms to Equation (9):

$$\int_{x_i}^{x_{i+1}} (f_i(x) - q(p^{-1}(x)))^2 dx \quad \text{(EQ 68)}$$

Where $p^{-1}(x)$ is the inverse of the cubic function $p(u)$ defined in Equation (61). As a result of the restriction that the spline must be a one value function of x, such an inverse exists and is uniquely determined.

The integral in Equation (68) represents an absolute value measure of the area between the QPF and spline and is greater than or equal to zero and is equal to 0 only if the spline and the QPF are coincident in the interval $[x_i, x_{i+1}]$. Thus, by minimizing this integral, we decrease the area error between the QPF and the spline.

Initially the inverse $p^{-1}(x)$ in Equation (68) would appear to be difficult to evaluate in practice. Although methods exist for the finding of an inverse of a cubic function, a better method of evaluating this integral is to rearrange the integral in Equation (68) with a sensible change of variable.

By making the change of variable of $x = p(u)$ and noting that $dx = p'(u)du$ and that $p^{-1}(p(u)) = u$, Equation (68) becomes:

$$\int_{u_i}^{u_{i+1}} (f_i(p(u)) - q(u))^2 p'(u) du \quad \text{(EQ 69)}$$

with $u_i$ such that $x_i = p(u_i)$.

The integral in Equation (69) is much simpler to evaluate as it is in a polynomial form and can be evaluated exactly without numerical techniques.

Hence Equation (68) can be seen as a possible measure of the error produced in approximating a particular stretch of spline with a QPF. Given Equation (31), this error is a function of the parameters of the QPF $i$, $n_i o$ and the splitting points $i$, $x_{i+}$.

If we now sum the contribution to the error for each of the N QPF's, we get a global measure of the total error:

$$Err = \sum_{i=0}^{N-1} \int_{x_i}^{x_{i+1}} (f(x) - q(p^{-1}(x)))^2 dx \quad \text{(EQ 70)}$$

Given p(u and q(u , Err will be a function of 4N−1 variables as each of the N QPF's gives 3 degrees of freedom being $l_i$, $n_i$,o. Additionally, the joining points of the QPF's also provide additional variables, apart from $x_0$ and $x_N$, which by virtue of Equation (65) are fixed to coincide with the endpoint of the spline, resulting in N−1 variables in total.

Thus, in a first instance, approximating a spline with N QPFs can be formulated as a minimization problem in a 4N−1 dimensional space with Err as objective function and minimizing Err by varying the 4N−1 parameters, decreases the 'distance' between the spline and the N QPFs.

Unfortunately, minimizing Equation (70) by itself may not give very high quality results as reducing the difference measure 35 between the spline and the QPFs does not guarantee the continuity of adjoining QPF's 36, 37, which will result in a severe degradation of the image. Hence, the continuity of endpoints should preferably be also enforced.

Figure 5:
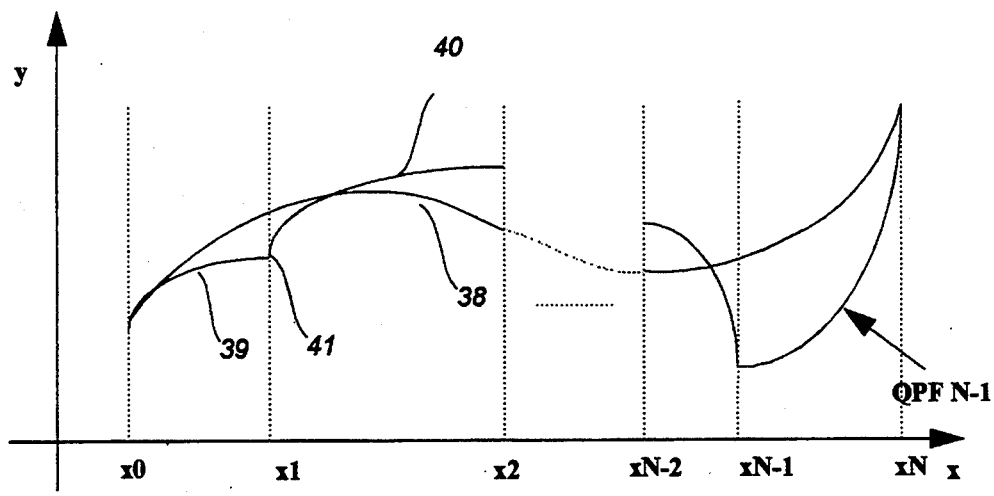
FIG. 5 illustrates the process of FIG. 4 whereby continuity between QPF's is maintained.

Referring now to FIG. 5, it is necessary to further restrict Equation (70) so as to guarantee the continuity of the QPF's. For example, QPFs 39, 40 are continuous at their endpoint 41.

In order to fulfil this additional constraint, the following restrictions must be placed on the QPF's.

The start point of our approximating curve must be coincident with one end of the spline:

$$q(u_a) = f_0(x_0) \rightarrow q(u_a) = m_0 x_0^2 + n_0 x_0 + o_0 \quad \text{(EQ 71)}$$

Each QPF must be coincident with the next one. Hence, $f_0(x_1$ must be equal to $f_1(x_1$, $f_1(x_2$ to $_2(x_2$ and so on. In the general case:

$$f_{i-1}(x_i) = f_i(x_i) \rightarrow m_{i-1}x_i^2 + n_{i-1}x_i + o_{i-1} = m_i x_i^2 + n_i x_i + o_i \quad \text{(EQ 72)}$$

with i $\in \{1, \ldots, N-1\}$.

Finally the end of our approximating QPF's must be coincident with the end of the spline:

$$q(u_b) = f_{N-1}(x_N) \rightarrow q(u_b) = m_{N-1}x_N^2 + n_{N-1}x_N + o_{N-1} \quad \text{(EQ 73)}$$

This requires an additional N+1 constraints on the QPF's guarantee a continuous approximating curve. Therefore, by adding N+1 constraints, we no longer have a minimization problem with 4N−1 degrees of freedom, but with only 3N−2 degrees.

In addition to guaranteeing the continuity of the approximating function, the approximation curve can be further improved by taking into account that the human eye is very sensitive to sharp changes of the derivative of a curve which may occur at the endpoints 41.

Therefore, preferably the search space is restricted even further so that the continuity of the derivatives at each endpoint is also achieved.

Initially, the derivative of the QPF and the derivative of the spline at the starting point must be coincident:

$$\frac{q'(u_a)}{p'(u_a)} = f'(x_0) \rightarrow \frac{q'(u_a)}{p'(u_a)} = 2m_0 x_0 + n_0 \quad \text{(EQ 74)}$$

with $$\frac{q'(u_a)}{p'(u_a)}$$

being the derivative of the spline at the point $x_0 = p(u_a)$ by the chain rule.

The derivative of the QPFs must also be the same at each join, hence:

$$i \in \{1, \ldots, N-1\} f'_{i-1}(x_i) = f'_i(x_i) \rightarrow 2m_{i-1}x_i + n_{i-1} = 2m_i x_i + n_i \quad \text{(EQ 75)}$$

Finally, the derivative of the last QPF must be equal to the one of the spline at the end point:

$$\frac{q'(u_b)}{p'(u_b)} = f'(x_N) \rightarrow \frac{q'(u_b)}{p'(u_b)} = 2m_N x_N + n_N \quad \text{(EQ 76)}$$

The assurance of continuity of derivatives will therefore add another N+1 constraints to the minimization problem which results in a total of 2N−3 degrees of freedom remaining.

In summary, the key issues in the formulation of the minimization problem are as follows:
creating a function whose minimum gives the best match between the spline and the QPFs;
adding constraints to the search space in order to get the continuity of the approximating function; and
adding further constraints in order to get the continuity of the first derivative of the approximating function.

The resulting approximating function can therefore be expressed as a function with 2N−3 independent variables, as putting constraints on the problem is equivalent to establishing relations among different variables of the problem and therefore reducing the number of independent variables. It is therefore possible to express some variables as function of others and substitute them in an objective function, which in this case is Equation (68), thereby reducing the number of independent variables.

One additional problem which may occur with the present embodiment is that the derivative of the spline may approach infinity, for example, where the spline forms a fragment of a circle. This problem is especially likely to occur at the endpoints of the spline.

One method of dealing with this problem is to have a separate test for dealing with excessive gradients whereby the excessive gradient is considered to be a straight line and dealt with as outlined previously under the section entitled 'Coefficient Limits'.

OPTIMIZATION

Although, ideally, every possible value of the remaining variables could be evaluated to determine which particular set of values will produce the lowest objective function, this is most often, in practice, impracticable due to the excessive numbers of variations of variables available.

Many different methods are known in the art for optimizing problems with excessive numbers of possible variable variations. In a first simple method, known as the steepest descent algorithm the variables are changed so that the variation in search space is in the opposite direction of the gradient of the objective function, therefore tending to minimize it. Unfortunately, this method of optimization may often become stuck in a local minimum state, failing to find the optimal solution.

SIMULATED ANNEALING

In the present embodiment the preferable method of optimization of the objective function is by means of simulated annealing. For a detailed explanation of the process of simulated annealing reference is made to "Optimization by Simulated Annealing" by S. Kirkpatrick, C. D. Gelatt, Jr., and M. P. Vecchi, (1983) Science, 220: 671–680. A brief outline of the process of simulated annealing is presented as follows:

The first step in a simulated annealing process is to state the problem at hand as an objective function, with a set of variables $x_1$ to $x_m$:

$$\text{value} = \text{obj\_fn}(x_1, x_2, x_3, x_4, \ldots, x_m) \quad (EQ\ 77)$$

The objective function is be able to be evaluated to a given value dependant on the current values of its variables $x_1$ to $x_m$.

The values of the variables $x_1$ to $x_m$ are given a small random change and the objective function is re-evaluated and compared to the old value of the objective function. The change in the objective function will be referred to as $\Delta obj$.

If the change in the variables has resulted in a lower objective function then the new set of variables is always accepted. If the change in the variables resulted in a higher value for the objective function then the new set of variables may or may not be accepted. The decision to accept the variables is determined with a given probability, the preferred probability of acceptance is:

$$Prob(\Delta obj) = e^{\left(\frac{-\Delta obj}{T}\right)} \quad (EQ\ 78)$$

where T is the simulated 'temperature' of the system.

Hence for a given $\Delta obj$, a high temperature T will result in a high probability of acceptance of the change in the values of $x_1$ to $x_m$, where as at a low temperature T, there will only be a small probability of acceptance. The temperature T is initially set to be quite high and is reduced slightly in each iteration of the annealing loop. The overall structure of a program implementing the simulating annealing process is as follows:

```
T = start_temperature;
variables = start_variables
loop_until (convergence or temperature_to_cold)
{
    /* generate random change of variables*/
    new_variables = random_small_change(variables);
    /* evaluate random change */
    Δobj = objective_function(new_variables) −
objective_function(variables);
    if( Δobj <= 0)
    {    /* always accept improvements */
        variables = new_variables;
    }
    else if (random_float_between_0_and_1( ) < exp(−Δobj/T))
    {
        /* sometimes accept degradation */
        variables = new_variables;
```

```
    }
    ELSE
    {
        /* reject new_variables*/
    }
    decrease T slightly, according to annealing schedule;
}
}
```

Figure 6:
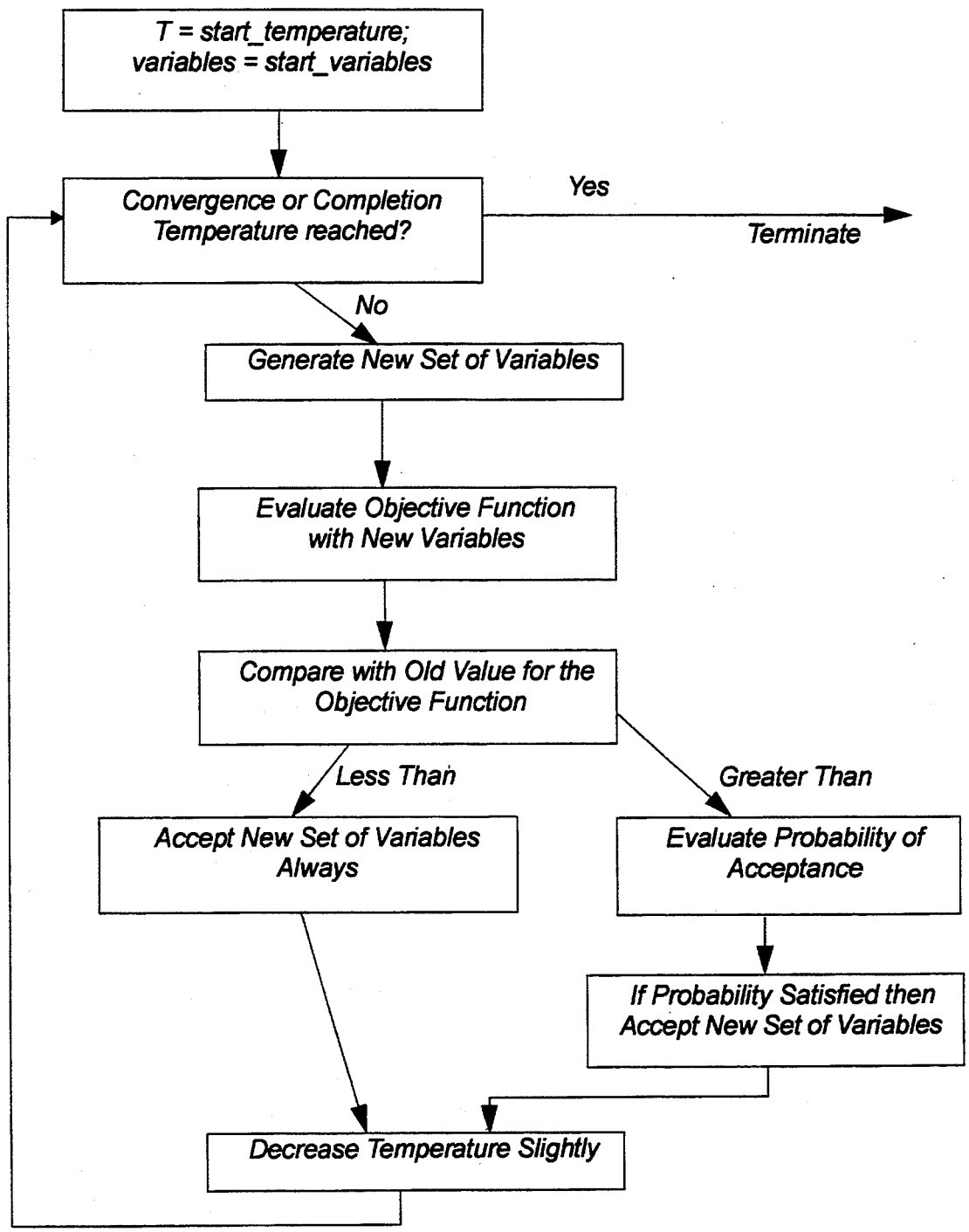
FIG. 6 is a flow chart illustrating the simulated annealing process.

A flow chart for use in implementing the above algorithm is shown in FIG. 6.

In the present method, the objective function to be used can preferably be defined as shown in Equation (68), although modifications of this equation may still produce suitable results.

ENDPOINT DEVIATION METHOD

A third method of converting splines to QPFs will now be described. This method is particularly designed for use with spline structures that form closed loops which are presented contiguously in a nose to tail order. In this method it is desired to provide a robust method which does not introduce artifacts into the resulting QPFs that adversely affect the quality of the graphical output, while providing a method that converts splines to QPF's in a minimum amount of time. Other objectives are to minimize the number of QPFs created while maintaining positional continuity between parabolic sections thereby ensuring that the QPF equivalent of the spline profile remains closed. Additionally, the slope continuity between the parabolic sections is maintained to within a predetermined tolerance, thereby ensuring a reasonable probability of a visually smooth approximation to the source spline.

The present method provides a means for converting splines to parabolas on demand and hence the arbitrary scaling and rotation of spline formatted images can be achieved while satisfying the requirement for a parabolic definition of a curves geometry.

As noted in the previous method, the spline description given in Equation (1) is easily capable of defining a spline that is multi-valued. That is, for each (X) pixel value, there can exist two or more (Y) line values. To overcome this the method first examines the algebraic components of each spline and splits the spline where necessary.

The parametric equation for the spline given in Equation (1) has eight degrees of freedom in two dimensions (x,y) and these degrees of freedom can often be determined by specifying the start and end points with their respective tangent directions. The parabolic format of the QPF, given in Equation (4) has three degrees of freedom and these are usually specified in one of two possible ways. Either:

specify the start point, the end point and a slope at one end, or specify the start point and the slope at both ends.

The latter description is used as a basis for this method of converting splines to a collection of QPFs.

Figure 7:
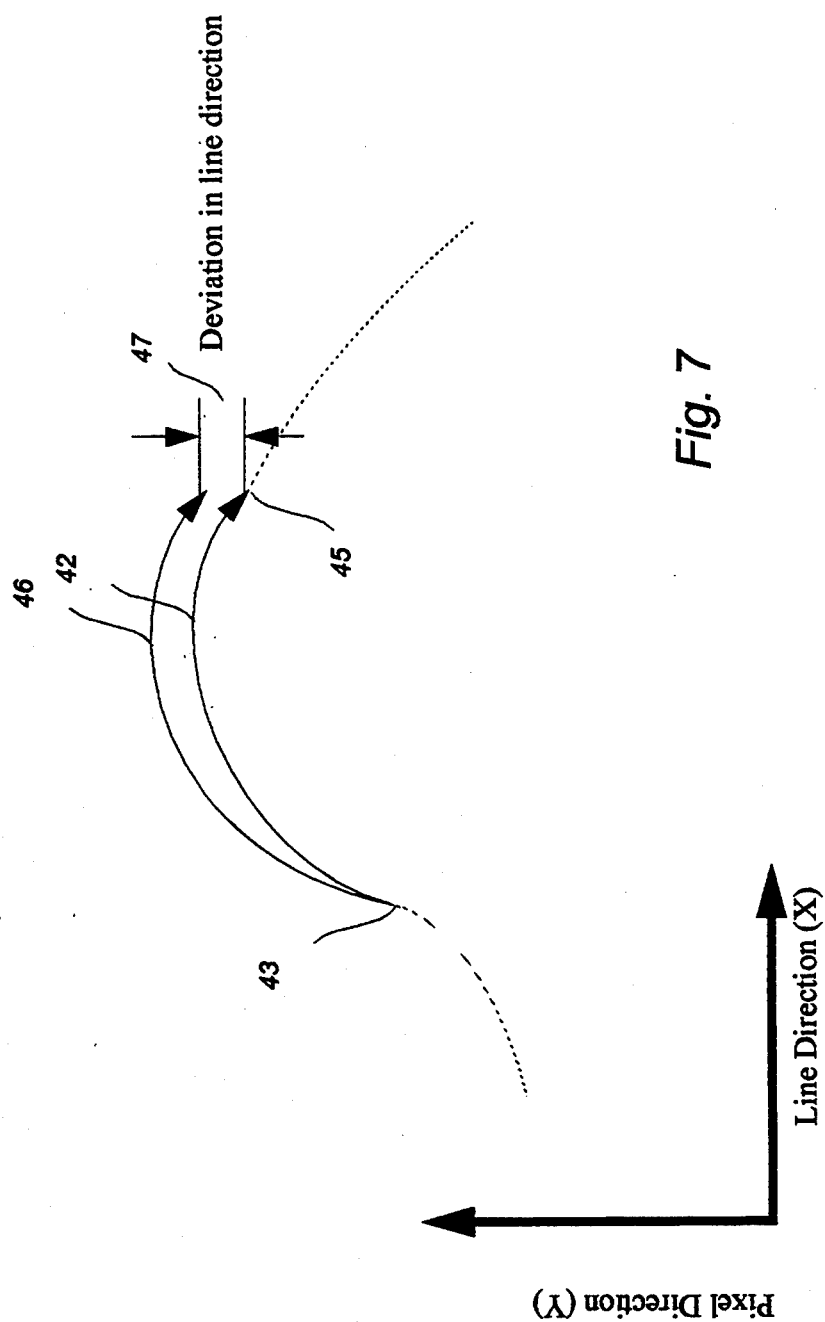
FIG. 7 is an illustration of the start of a third method of converting splines to QPFs.

Referring now to FIG. 7, there is shown the start of a profile calculation from the start point 43 of the spline 42. From this starting point a parabola 46 is calculated so that it passes through the start point 43 and has the same start and end slopes as the given spline.

The X value of the endpoint of the parabola 44 of the parabola 46 is then measured and compared with the endpoint of the spline 45. If the deviation in the line direction 47 is less than a predetermined tolerance then the parabola 46 is accepted as a sufficiently accurate approximation of the spline 42 and the method is then applied to the next spline, otherwise the spline 42 is split into two splines using methods outlined previously and the method is recursively applied to each half of the spline 42.

Figure 8:
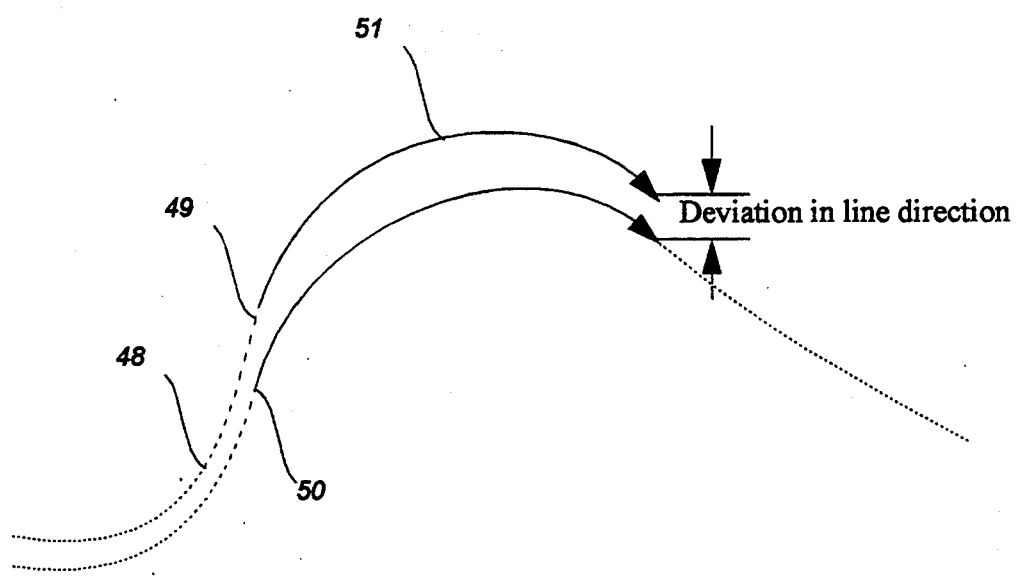
FIG. 8 is an illustration of a continuation of the method of FIG. 7.

Referring now to FIG. 8, once a previous parabola 48 has been calculated, then the end point of previous parabola 49 is used as the starting point for the current parabola 51 rather than the start point of the current spline 50, while also ensuring that the parabola maintains positional continuity as well as slope continuity where required.

The parabolic curve representation as described previously cannot cope with vertical or near-vertical slopes as the gradient can be forced to exceed the maximum possible gradient. To overcome this the method separately detects this condition and sets the slope of the corresponding QPF to a maximum positive or maximum negative slope appropriately.

As the process progresses around the spline profile, both positional and slope continuity are adhered to between QPF segments. In order to close the profile however the alternative solution of calculating a parabola to pass through a start point, end point and start slope must be used. This will affect the slope constraint between the last and first parabolic segment.

The visual significance of this event can be substantially overcome in the majority of circumstances by preprocessing the given spline profile so that the start point 43 if the first QPF approximation starts at a slope discontinuity. Thus when the algorithm terminates there is no requirement to match slope continuity.

If no slope discontinuity exists on the spline profile, the method can further reduce the effect of the terminating discontinuity by altering the start slope of the last parabola in favour of the end slope so that the visual impact of the resulting termination discontinuity is minimised.

As a criterion for determining whether it is necessary to split the last parabola into sub-parabolas, a point somewhere along the parabola can be used and the distance between the parabola and its corresponding spline measured. The preferred point is one which is approximately two-thirds of the length of the parabola. If this distance is greater than a predetermined amount, the spline and corresponding parabola may be split and the process continued.

The foregoing describes only a few embodiments of the conversion of a spline based graphical object representation to a quadratic polynomial based representation and modifications, obvious to those skilled in the art, can be made thereto without departing from the scope of the present invention.

We claim:

1. A method for converting an object of a computerized graphics system defined by a plurality of spline formats into a corresponding object defined by a plurality of quadratic polynomial fragments (QPF), said method comprising, for each spline of said object, the steps of:
   (a) selecting start and end points on said spline and designating the selected start and end points as control start and end points on the corresponding QPF;
   (b) determining from the control points of the spline, coefficients of a quadratic polynomial defining the QPF;
   (c) using the coefficients to determine if an error between the spline and the quadratic polynomial is below a predetermined level; and
   (d) determining from said coefficients, in the case the error is below the predetermined level, QPF data describing said quadratic polynomial.

2. A method according to claim 1, wherein, in the case the error is not below the predetermined level, performing the steps of:
   (e) dividing the spline into at least two sub-splines for each of which a corresponding QPF is to be determined, and repeating steps (a) to (d) for each sub-spline; and
   (f) repeating step (e) as necessary until the error between each quadratic polynomial and the corresponding sub-spline is below the predetermined level.

3. A method according to claim 1, wherein said error includes a measure of the area between said spline and said QPF.

4. A method according to claim 1, wherein said error includes a measure of the angle between an endpoint of said spline and an endpoint of said QPF.

5. A method according to claim 1, wherein said error includes a measure of the area between said spline and said QPF, and a measure of the angle between an endpoint of said spline and an endpoint of said QPF.

6. A method for converting an object of a computerized graphics system defined by a plurality of spline formats into a corresponding quadratic polynomial fragment (QPF) object defined by a plurality of quadratic polynomial fragments (QPF's), said method comprising, for each spline of said object, the steps of:
   (a) selecting start and end points on said spline and designating the selected start and end points as control start and end points for a plurality of QPF's on the corresponding QPF object;
   (b) determining from the control points of the spline, coefficients of a quadratic polynomial defining each said QPF;
   (c) using the coefficients to determine if an error between the spline and the quadratic polynomials is below a predetermined level; and
   (d) determining from said coefficients, in the case the error is below the predetermined level, QPF data describing said quadratic polynomials.

7. A method according to claim 3, wherein, in the case the error is not below the predetermined level, performing the steps of:
   (e) dividing the spline into at least two subsplines for each of which corresponding quadratic polynomials are to be determined, and repeating steps (a) to (d) for each said sub-spline; and
   (f) repeating step (e) as necessary until the error between each quadratic polynomial and the corresponding sub-spline is below the predetermined level.

8. A method according to claim 6, wherein said error includes a measure of the area between said spline and said QPF.

9. A method according to claim 6, wherein said error includes a measure of the angle between and endpoint of said spline and an endpoint of said QPF.

10. A method according to claim 6, wherein said error includes a measure of the area between said spline and said QPF, and a measure of the angle between an endpoint of said spline and an endpoint of said QPF.

11. A method for converting an object of a computerized graphics system described by a plurality of spline formats into a corresponding object described by a plurality of quadratic polynomial fragments (QPF), said method comprising, for each spline of said object, the steps of:

determining a set of equations with corresponding variable values describing an error associated with said splines and the QPFs corresponding to the splines; and optimizing said set of equations to determine a set of variable values providing a best match between the splines and the QPFs corresponding to the splines.

12. A method according to claim 11, wherein said set of equations defines a set of continuous OPF's.

13. A method according to claim 12, wherein said set of equations defines a set of QPF's with continuous first derivatives.

14. A method according to claim 11, wherein said optimizing step comprising optimizing said set of equations using simulated annealing.

15. A method for converting a portion of an object of a computerized graphics system, said portion being described by a plurality of splines forming a closed loop, into a corresponding object described by a plurality of quadratic polynomial fragments (QPF), said method comprising the steps of:

(a) selecting a first spline of said closed loop and with said first spline:
  (i) selecting a QPF starting point corresponding to the starting point of a first spline,
  (ii) calculating a corresponding starting QPF having the same starting slope and same end slope as said spline,
  (iii) measuring the difference between the endpoint of said QPF and the endpoint of said first spline,
  (iv) if said difference is less than a first predetermined tolerance, then accepting said starting QPF as a sufficiently accurate approximation to the first spline and proceeding with steps (b) and (c) for the other splines in the closed loop,
  (v) if said difference is not less than the first predetermined tolerance, then splitting said first spline into at least two spline portions and applying step (a) to a first portion of said first spline, and steps (b) and (c) to the other portions, (b) with all the intermediate splines in said closed loop:
  (i) selecting an endpoint of a previously calculated QPF as the starting point of a current QPF,
  (ii) calculating a current QPF having the same starting slope and same end slope as the corresponding said intermediate spline,
  (iii) measuring the difference between the endpoint of said current QPF and the endpoint of said corresponding intermediate spline,
  (iv) if said difference is less than a second predetermined tolerance, then accepting said current QPF as a sufficiently accurate approximation of the corresponding intermediate spline and proceeding with steps (b) and (c) for the other splines in the closed loop,
  (v) if said difference is not less than the second predetermined tolerance, then splitting said current spline into at least two spline portions and performing steps (b) and (c) on said spline portions, (c) with a final spline in said closed loop:
  (i) selecting an endpoint of a previously calculated QPF as the starting point of a last QPF,
  (ii) calculating a last QPF having the same starting slope and same endpoint as said final spline,
  (iii) determining if a predetermined criterion is satisfied between said last QPF and said final spline,
  (iv) if said criterion is satisfied, then accepting said final QPF as a sufficiently accurate approximation to the final spline,
  (v) if said criterion is not satisfied, then splitting said final spline into at least two spline portions and performing steps (b) and (c) on said spline portions.

16. A method according to claim 15, wherein said predetermined criteria comprise measuring the distance between a first point of the last QPF and a point on the final spline.

17. A method according to claim 15, wherein said first point is approximately two-thirds along said last QPF.

18. A method according to claim 15, wherein said closed loop has at least one slope discontinuity, said start point of said first spline is chosen at a slope discontinuity of said closed loop.

19. A method according to claim 15, wherein said corresponding object has positional continuity around said loop.

20. A method according to claim 19, wherein the gradient of said QPF exceeds a predetermined maximum gradient, the gradient of said QPF is set to be said predetermined maximum.

21. A method according to claim 19, wherein when the gradient of said QPF is less than a predetermined minimum gradient, the gradient of said QPF is set to be said predetermined minimum.

22. An apparatus for converting an object of a computerized graphics system defined by a plurality of spline formats into a corresponding object defined by a plurality of quadratic polynomial fragments (QPF), said apparatus comprising, for each spline of said object:

(a) selector means for selecting start and end points on said spline and designating the selected start and end points as control start and end points on the corresponding QPF;

(b) determining means for determining from the control points of the spline, coefficients of a quadratic polynomial describing the QPF;

(c) processing means for using the coefficients to determine if an error between the spline and the quadratic polynomial is below a predetermined level; and (d) output means for determining from said coefficients, in the case the error is below the predetermined level, QPF data describing said quadratic polynomial.

* * * * *

UNITED STATES PATENT AND TRADEMARK OFFICE
CERTIFICATE OF CORRECTION

PATENT NO. : 5,422,990

DATED : June 6, 1995

INVENTORS : Kia Silverbrook, et al.

It is certified that error appears in the above-identified patent and that said Letters Patent is hereby corrected as shown below:

COVER PAGE

Under [19], "Siverbrook et al." should read
--Silverbrook et al.--; and

Under [75] Inventors, "Kia Siverbrook" should read
--Kia Silverbrook--.

COLUMN 1

Line 48, "(iv)" should read --(ii)-- and
Ser. No. 08/053,363" should read --Ser. No. 08/053,365--;
Line 53, "(v)" should read --(iii)--;
Line 58, "(vi)" should read --(iv)--; and
Line 60, "No. PL2145 Apr. 29, 1992" should read
--No. PL2145, filed Apr. 29, 1992--.

COLUMN 5

Line 19, "$\underline{r} = \underline{r(u)} = \underline{a}_0 + \underline{ua}_1 + u^2\underline{a}_2 + u^3\underline{a}_3$" should read
$\underline{r} = \underline{r}(u) = \underline{a}_0 + u\underline{a}_1 + u^2\underline{a}_2 + u^3\underline{a}_3$--; and Line 47, "$y = f(x) = ax^2 + bx + cx_{start} \leq x \leq x\ end$" should
read --$y = f(x) = ax^2 + bx + c \quad x_{start} \leq x \leq x\ end$--.

COLUMN 7

Line 26, "$\Delta Pixel$" should read --$\Delta\Delta Pixel$--.

UNITED STATES PATENT AND TRADEMARK OFFICE
CERTIFICATE OF CORRECTION

PATENT NO. : 5,422,990

DATED : June 6, 1995

INVENTORS : Kia Silverbrook, et al.

Page 2 of 3

It is certified that error appears in the above-identified patent and that said Letters Patent is hereby corrected as shown below:

COLUMN 9

Line 59, "$60x_1x_3^2y_1+\beta_1=27x_1^2x_3y_1-36x_1x_2x_3y_1-18x_2^2x_3y_1$" should read --$\beta_1=-27x_1^2x_3y_1-36x_1x_2x_3y_1-18x_2^2x_3y_1+60x_1x_3^2y_1+$--.

COLUMN 11

Line 37, "integral" should be deleted.

COLUMN 12

In (EQ 30), "$\frac{y_2y_3}{7}$ 0" should read --$\frac{y_2y_3}{70}$--.

COLUMN 13

Line 11, "$(x_a,y_a)$" should read --$(X_a,Y_a)$--; and "$(x_b,Y_b)$" should read --$(X_b,Y_b)$--.

COLUMN 14

In (EQ 46), "$2y_a(x_n-x_{join})$" should read --$2y_a(x_b-x_{join})$-- and "$(x_{joi}-x_a)$" should read --$(x_{joi}-x_a)$--.

COLUMN 16

Line 48, "$x_{a3},y_{a3})$" should read --$(X_{a3},Y_{a3})$--;

UNITED STATES PATENT AND TRADEMARK OFFICE
CERTIFICATE OF CORRECTION

PATENT NO. : 5,422,990

DATED : June 6, 1995

INVENTORS : Kia Silverbrook, et al.

It is certified that error appears in the above-identified patent and that said Letters Patent is hereby corrected as shown below:

COLUMN 16 (Cont.)

Line 64, "$+u^2x_3$" should read --$+ux_3$--.

COLUMN 19

Line 47, "i $\epsilon$e" should read --i $\epsilon$--.

COLUMN 20

Line 3, "$2m_0x_0$" should read -- $=2m_0x_0$ --; and
Line 16, "i $\epsilon$" should read --$\forall$i $\epsilon$--.

COLUMN 24

Line 50, "claim 3" should read --claim 6--.

Signed and Sealed this

Twenty-fourth Day of October, 1995

Attest:

BRUCE LEHMAN

*Attesting Officer*        *Commissioner of Patents and Trademarks*

UNITED STATES PATENT AND TRADEMARK OFFICE
CERTIFICATE OF CORRECTION

PATENT NO. : 5,422,990

DATED : June 6, 1995

INVENTORS : Kia Silverbrook, et al.

It is certified that error appears in the above-identified patent and that said Letters Patent is hereby corrected as shown below:

COLUMN 5

Line 25, "$0 \leq u\ 1$" should read --$0 \leq u \leq 1$--.

COLUMN 18

Line 35, "$p^{-1}(x$" should read --$p^{-1}(x)$--;
Line 68, "$_i, n_i, o$" should read --$m_i, n_i, o_i$--; and
Line 69, "$_i, x_{i+}$" should read --"$x_i, x_{i+1}$--.

COLUMN 19

Line 9, "$q(u$" should read --$q(u)$--;
Line 11, "$_i, n_i, o$" should read --$m_i, n_i, o_i$--; and
Line 42, "$f_1(x_1, f_1(x_2$ to $_2(x_2$" should read
--$f_1(x_1), f_1(x_2)$ to $f_2(x_2)$--.

COLUMN 20

Line 8, $p'(u_a$" should read --$p'(u_a)$--.

Signed and Sealed this

Twenty-ninth Day of October 1996

Attest:

BRUCE LEHMAN

*Attesting Officer*  *Commissioner of Patents and Trademarks*